C. G. GRABO.
CULTIVATING MACHINE.
No. 38,676. Patented May 26, 1863.
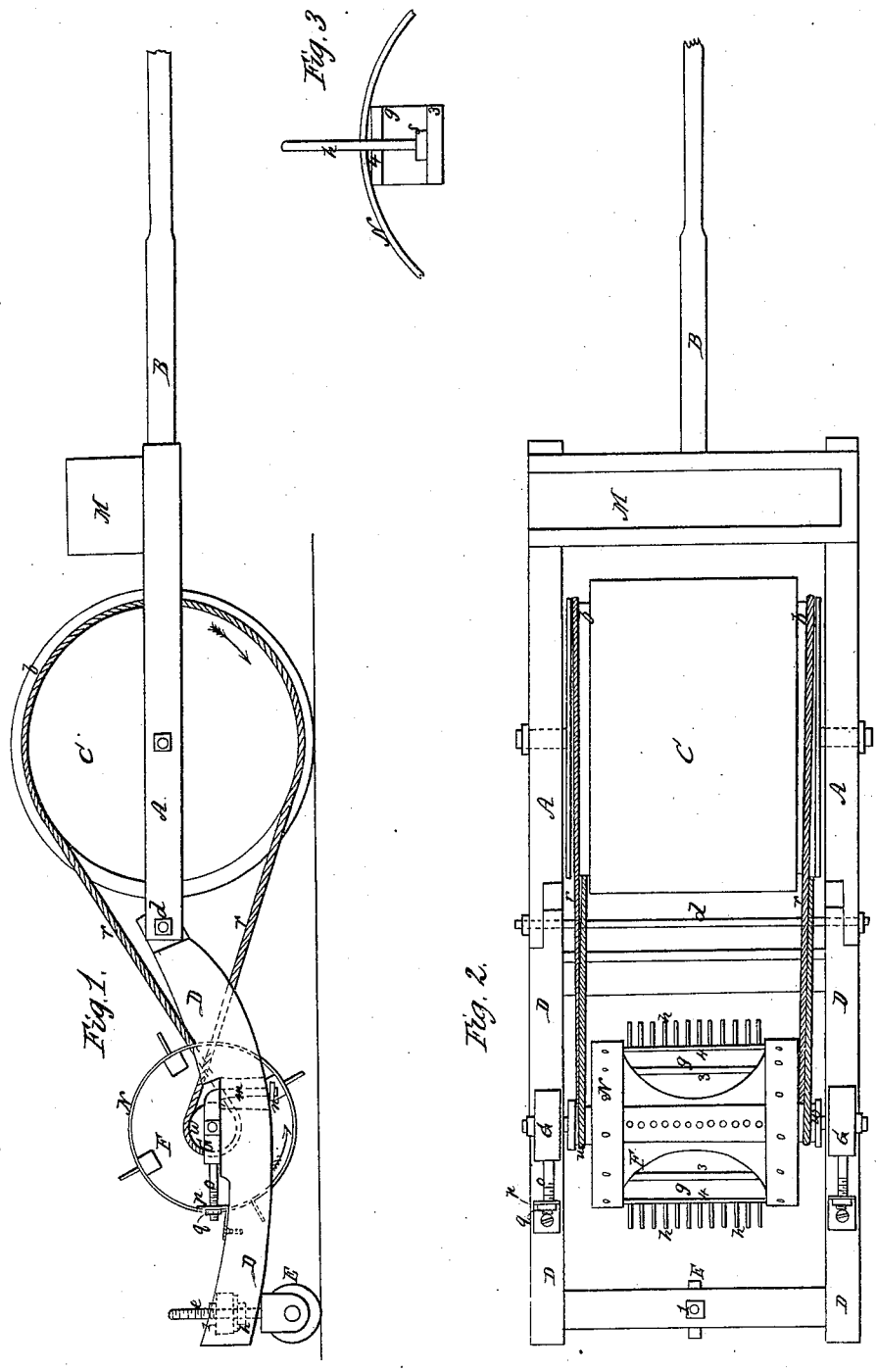

UNITED STATES PATENT OFFICE.

C. G. GRABO, OF GREENFIELD, MICHIGAN.

IMPROVEMENT IN CULTIVATING-MACHINES.

Specification forming part of Letters Patent No. 38,676, dated May 26, 1863.

*To all whom it may concern:*

Be it known that I, C. G. GRABO, of the township of Greenfield, in the county of Wayne and the State of Michigan, have invented a new Rolling Cultivator; and I do hereby declare that the following is a full and exact description of the said invention.

Figure 1 represents a side view of said cultivator. Fig. 2 represents a top view of the same. Fig. 3 represents a detached view, hereinafter to be referred to.

My invention relates to that class of cultivators which are used to break up the hard lumps or clods on a plowed field, and which in dry weather and on hard soil cannot be done effectually by means of harrows.

To enable others skilled in the art to make and use my invention, I will proceed to describe its construction and operation.

A represents an immovable frame, to which the draft-pole B for the horses is attached.

C represents a wooden roller which supports the frame A, and which turns on the shaft $a$. The roller C has grooves $b$ turned on its circumference at both its ends, for the reception of belts or ropes $r$, which operate the rotating cultivator.

D represents a hinged frame which is pivoted to the stationary frame A by means of the bolt $d$, and supported at its rear by means of the caster-wheel E. The shank $e$ of the caster-wheel passes through the cross-tie at the rear end of the frame D, and has a screw-thread cut on its circumference, on which two nuts, 1 and 2, can be operated to raise and lower said rear end, for the purpose of adjusting the depth to which the cultivator-teeth shall work.

F represents the rotating cultivator, the body of which is wood; and the cultivator or harrow teeth are secured within wooden cross-pieces $g$ in the following manner, represented in an enlarged view in Fig. 3: The cultivator-tooth $h$ has a head, $s$, at its inner end, which rests upon a flat iron bar, 3. The shank of the cultivator passes through the cross-piece $g$, and another iron bar, 4, which is effectually secured to the body of the cultivator by means of a strong iron tire, N, which may be secured to said body by means of screws or otherwise. By this arrrngement I am enabled to replace or remove any of the cultivator-teeth with the greatest facility, should they break or need repairing. The journals of the cultivator turn within adjustable journal-boxes G of the following construction: The vertical shank $m$ passes through a slot in the side piece of the hinged frame D, and may be secured in any desired position by means of the screw-nut $n$. The horizontal shank $o$ of said journal-box passes through the vertical part of the angular iron $p$, and the position of the journal-box may be adjusted by means of the screw-nut $q$ on the shank, which is necessary to impart to the ropes or belts $r$ the desired tension to rotate the cultivator. The rotating cultivator is operated by means of the ropes or belts $r$, which pass around the pulleys $b$ of the roller C and around the small pulleys $w$ of the cultivator; but I cross said belts, as shown in the drawings, for the purpose of turning the cultivating-cylinder in a direction opposite to that of the roller C.

The operation of the machine is as follows: As the implement is drawn over the field the roller C turns in the direction of the arrow—that is, the upper part of its circumference turns to the rear while the lower part of the operating circumference of the cultivator F turns toward the front of the machine. The teeth of the cultivator, being operated at a high velocity, break up the clods; but those clods which are not pulverized are pushed forward and broken up through the repeated strokes of the cultivator-teeth, which would not be the case if the cultivator were to turn in the same direction with the driving-roller C, and by this arrangement I am enabled to effectively break up the clods of even the hardest and driest soil.

The box M in front of the driving-roller is a receptacle for stones or weights in case the roller should drag and slip over the ground, and will thus serve to regulate the weight of the machine.

Having thus fully described the nature of my invention, what I claim herein as new, and desire to secure by Letters Patent, is—

1. In combination with the rotary cultivator and hinged cultivator-frame, as herein described, the adjustable journal-boxes G, for regulating the extension of the ropes or belts by which the cultivator is rotated, substantially in the manner herein set forth.

2. Securing the teeth of the cultivator to the body of the same, substantially in the manner and for the purposes herein described.

CHRISTIAN G. GRABO.

Witnesses:
  E. SCHOBER,
  F. ROHNERTSEN.